US010652803B2

(12) United States Patent
Wang et al.

(10) Patent No.: US 10,652,803 B2
(45) Date of Patent: May 12, 2020

(54) COMMISSIONING OF LIGHTING DEVICES (71) Applicant: SIGNIFY HOLDING B.V., Eindhoven (NL)

(72) Inventors: Gang Wang, Eindhoven (NL); Dunfa Chen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/758,286

(22) PCT Filed: Sep. 6, 2016

(86) PCT No.: PCT/EP2016/070956
§ 371 (c)(1),
(2) Date: Mar. 7, 2018

(87) PCT Pub. No.: WO2017/042153
PCT Pub. Date: Mar. 16, 2017

(65) Prior Publication Data
US 2018/0255506 A1    Sep. 6, 2018

(30) Foreign Application Priority Data

Sep. 8, 2015  (WO) ................ PCT/CN2015/000632
Oct. 8, 2015  (EP) ..................................... 15188866

(51) Int. Cl.
*H04W 48/16* (2009.01)
*H05B 37/02* (2006.01)
(Continued)

(52) U.S. Cl.
CPC .......... *H04W 48/16* (2013.01); *H04B 17/318* (2015.01); *H04L 41/0806* (2013.01);
(Continued)

(58) Field of Classification Search
CPC ... H04W 48/16; H04W 17/318; H04W 8/005; H04W 88/04; H04L 41/0806; H05B 37/0272
(Continued)

(56) References Cited

U.S. PATENT DOCUMENTS

2003/0012168 A1   1/2003 Elson et al.
2012/0187851 A1*  7/2012 Huggins ................. H02J 7/025
                                                  315/159

(Continued)

FOREIGN PATENT DOCUMENTS

GB    2518469 A    3/2015
WO    0178307 A2   10/2001
(Continued)

*Primary Examiner* — Sai Ming Chan
(74) *Attorney, Agent, or Firm* — Daniel J. Piotrowski (57) ABSTRACT

A method of enabling at least some of plurality of nodes to join a wireless network, where each operates according to a wireless networking protocol and each is a component of a lighting system. An initiating unit wirelessly broadcasts a discovery request using a protocol of the network, according to which each other node only responds to the discovery request as broadcast from the initiating unit on condition of being within a predetermined range. Hence one or more in-range nodes each respond to the discovery request from the initiating unit and thereby join the network, while one or more out-of-range nodes do not respond. One or more of the in-range nodes also act as relaying nodes, to re-broadcast the discovery request for receipt by one or more of the out-of-range nodes. One or more of the out-of-range nodes respond to the re-broadcast discovery requests, thereby joining the wireless network.

13 Claims, 5 Drawing Sheets (51) Int. Cl.
  *H04B 17/318* (2015.01)
  *H04L 12/24* (2006.01)
  *H04W 8/00* (2009.01)
  *H04W 88/04* (2009.01)

(52) U.S. Cl.
  CPC ......... *H05B 37/0272* (2013.01); *H04W 8/005* (2013.01); *H04W 88/04* (2013.01)

(58) Field of Classification Search
  USPC ........................................................ 370/254
  See application file for complete search history.

(56) References Cited

U.S. PATENT DOCUMENTS

| | | | |
|---|---|---|---|
| 2014/0139116 A1* | 5/2014 | Reed | H05B 33/0854 315/153 |
| 2015/0126200 A1 | 5/2015 | Wang et al. | |
| 2015/0173154 A1 | 6/2015 | Faulkner | |
| 2015/0220428 A1 | 8/2015 | Simonyi et al. | |
| 2016/0100355 A1* | 4/2016 | Chen | H04W 8/005 370/232 |
| 2017/0265046 A1* | 9/2017 | Chen | H04W 4/08 |

FOREIGN PATENT DOCUMENTS

| | | |
|---|---|---|
| WO | 2006095317 A1 | 9/2006 |
| WO | 2006136985 A1 | 12/2006 |
| WO | 2010023619 A1 | 3/2010 |
| WO | 20110045719 A1 | 4/2011 |
| WO | 2012052890 A1 | 4/2012 |
| WO | 2014030103 A2 | 2/2014 |
| WO | 2015049259 A1 | 4/2015 |

* cited by examiner

Figure 1

Touchlink vicinity range
Determined by RSSI threshold

One-hop communication range
Determined by RF characteristics

Figure 2

DiscoveryDuration aplcScanTimeBaseDuration

Figure 3

| Bits: 0 | 1 | 2-3 | 4 | 5 | 6-7 |
|---|---|---|---|---|---|
| Factory new | Address assignment | Reserved | Link initiator | Undefined (can be 0 or 1) | Reserved |

Figure 11

COMMISSIONING OF LIGHTING DEVICES

CROSS-REFERENCE TO PRIOR APPLICATIONS

This application is the U.S. National Phase application under 35 U.S.C. § 371 of International Application No. PCT/EP2016/070956, filed on Sep. 6, 2016 which claims the benefit of Chinese Patent Application No. PCT/CN2015/000632 filed on Sep. 8, 2015 and European Patent Application No. 15188866.6, filed on Oct. 8, 2015. These applications are hereby incorporated by reference herein.

TECHNICAL FIELD

The present disclosure relates to the commissioning of a network of lighting devices, such as in a ZigBee Light Link (ZLL) network.

BACKGROUND

Mesh networking is a type of networking topology whereby each node in the network is able not only to capture data for its own purposes, but also act as a relay to forward data onwards to another node in the network. An example is ZigBee, which refers to a suite of protocols including ZigBee Light Link designed for mesh networking.

ZigBee Light Link (ZLL) is an open standard designed for LED lighting control. Components such as LED fixtures, sensors, timers, remotes and switches configured according to ZLL can connect into a network without a special device to coordinate this. As an example of a ZLL based system, Philips hue is a ZLL based lighting system containing a bridge controller and a number of lighting nodes (e.g. LED "bulbs"). The bridge device has the function of bridging between the ZigBee devices (e.g. lighting nodes) and one or more other devices such as IP devices (e.g. a smart phone or tablet), but it does not act as a centralized coordinator, at least not for the purpose of the ZLL networking protocol.

To make sure that consumers can easily install and add devices into their home lighting network, ZLL includes a commissioning mechanism which is simple for consumers and does not have a need for a coordinator. This mechanism is known as Touchlink. Taking the Philips hue system as an example, the basic steps of the Touchlink based network commissioning, i.e. the process of connecting the bridge controller and multiple other nodes such as light bulbs into a ZLL network, are as follows.

First, the user initiates the network creation process by invoking the "discover new bulbs" operation using a smart phone app.

Next, the bridge controller performs the device discovery procedure of the Touchlink commissioning process. As the initiator, the bridge controller broadcasts eight inter-PAN (inter personal area network) scan request command frames, spaced at a predefined interval, which is roughly 250 ms. Devices (e.g. the bulbs) receiving the scan request may choose whether to respond and, if so, the device shall unicast a scan response inter-PAN command frame back to the initiator. A device shall only respond to a received scan request if its RSSI (received signal strength indicator) is above a certain manufacture specific threshold, which determines the so-called Touchlink vicinity range of the initiator. In other words, only devices located within the range can be discovered by the initiator.

Then the bridge select one of the devices discovered in the above step and unicasts a network start request inter-PAN command frame to the selected device. On receipt of the request, the selected device shall start a new network and unicast a network start response inter-PAN command frame to the bridge indicating success.

For the rest of the discovered devices, the bridge shall unicast a network join router (or join end device) request inter-PAN command frame to each of these devices. On receipt of the request, the device shall join the network and unicast a network join router (or join end device) response inter-PAN command frame to the bridge indicating success.

SUMMARY

As mentioned, a device (e.g. a bulb) must be located within the Touchlink vicinity range of the initiator (e.g. the bridge controller) for it to be discovered and further be added into a network. However, imaging the user may have a large installation base such as a villa or professional space like a retail store, then devices can easily stay outside the initiator's Touchlink vicinity range (e.g. the distance between the device and the bridge controller exceeds 2 m), or even outside a one-hop communication range of the initiator. The reason for setting a shorter Touchlink vicinity range in the ZLL standard is to avoid unintended commissioning, e.g. wrongly discovery (and commissioning) of devices which belong to your neighbour. The current workaround is either to bring the device to be commissioned closer to the initiator (and then take it back to its installation location after being commissioned), or input the serial number of the device in the smart phone app. In the latter case, the initiator uses the serial number to "convince" a lamp outside the Touchlink vicinity range to respond to the scan request. However, this won't work for devices outside the one-hop communication range, because these devices won't receive the scan request at all (ZLL doesn't allow multi-hop relay of inter-PAN command frames). Also, both workarounds are inconvenient, especially when the number of devices is high.

Therefore it would be desirable to provide a better commissioning solution for ZLL that is on one hand convenient enough to add all desired devices into network without user involvement, and on the other hand safe enough to avoid unintended commissioning such as the "stealing" of other users' devices. Similar considerations could also apply in relation to other ZigBee standards or other mesh networks.

The present invention provides a new commissioning method for a mesh network such as a ZLL network, wherein the method has an expandable device discovery range, and embodiments a security mechanism to avoid unintended commissioning of a device. The new method may be realized by reusing the Touchlink operation of the current ZLL standard. To expand the device discovery range, the new method relays the device discovery process with a certain depth among the nodes to be commissioned, and then delegates the "adding nodes into network" task to selected nodes. To avoid unintended commissioning, preferably the new method also uses a time-window based mechanism: a node only accepts relayed discovery requests within a predetermined duration after being powered on (or reset, or leaving a previous network—basically any event that causes the node to begin the process of joining a network itself).

According to one aspect disclosed herein, there is provided a method of enabling at least some of plurality of nodes to join a wireless network. Each of said plurality of nodes is configured to operate according to a wireless networking protocol of said network, and each is a component device of a lighting system, with at least some of said plurality of nodes comprising illumination sources. According to said method, an initiating unit wirelessly broadcasts a discovery request using said wireless networking protocol. According to said protocol each of said plurality of nodes is configured to only respond to the discovery request as broadcast from the initiating unit on condition of being within a predetermined range of the initiating unit. Hence, one or more in-range nodes each respond to the discovery request from the initiating unit and thereby join the wireless network, while one or more out-of-range nodes do not respond to the discovery request from the initiating unit, the in-range nodes being ones of said plurality of nodes that are within said range of the initiating unit, and the out-of-range nodes being ones of said plurality of nodes that are beyond said range of said initiating unit. Furthermore, one or more of the in-range nodes act as relaying nodes, to re-broadcast the discovery request for receipt by one or more of the out-of-range nodes; and one or more of the out-of-range nodes each respond to the discovery requests as re-broadcast from one of the relaying nodes, thereby joining the wireless network (despite being out of range of the initiating unit).

In embodiments, one or more of the out-of-range nodes may each also act as a relay node to re-broadcast the discovery request for receipt by a further one or more of the out-of-range nodes. Thus the request is re-broadcast over two or more hops, each instance of the discovery request being broadcast or re-broadcast being a hop. In this case, one or more of the out-of-range nodes each respond to the discovery request as re-broadcast by another, preceding one of the out-of range relay nodes, thereby joining the wireless network.

In embodiments, each of the out-of-range nodes is configured to only respond to the re-broadcast discovery request if within a predetermined number of hops of the initiating unit. Thus although the reach of the discovery process is extended, it may nonetheless still be limited to a certain scan depth. Therefore advantageously, the discovery can be extended beyond the conventional Touchlink radius (or the like) but while still limiting the chance of unrelated nodes being mistakenly pulled into the network.

In embodiments, each of the in-range relaying nodes may insert a remaining hop count in the discovery request (i.e. a count of a remaining number of hops to be included as part of the discovery process), and this count is decremented each time the discovery request is re-broadcast. Each of the out-of-range nodes receiving the discovery request can then determine whether it is within said predetermined number of hops based on the remaining hop count as received in the re-broadcast discovery request.

In embodiments, each respective one of the out-of-range nodes only responds to the re-broadcast discovery request if received within a specified response time window from a time of the respective out-of-range node powering up, being reset, or leaving a previous network. This again adds to the security of the system, in that it limits the chance of inappropriate nodes (e.g. a neighbour's nodes) incorrectly being pulled into the network.

In embodiments, the response time window may be a function of the remaining hop count (e.g. a linear function of the remaining hop count, such as the remaining number of hops count multiplied by a constant, optionally plus or minus another constant).

In embodiments, each respective one of the relaying nodes only re-broadcasts the discovery request if within a specified relaying time window from a time of the respective relaying node powering up, being reset, or leaving a previous network.

In embodiments, one or more of said plurality of nodes may be devices other than illumination sources, each being one of: a switch, a timer, a sensor, or a remote control unit.

In embodiment, when each responding one of the out-of-range nodes responds to a respective one of the re-broadcast discovery requests from a respective one of the relaying nodes, the responding node sends a respective response back to the respective relaying node and the respective relaying node may perform the joining of the responding node to the network on behalf of the initiating unit.

In embodiments, the respective relaying node may be delegated a free address range allowed by the initiating unit; and when joining the responding node to the network, this may comprise the respective relaying node assigning the responding node an address from within the free address range by which to be addressed within the network.

In embodiments, said protocol may be a ZigBee protocol. In particular embodiments, said protocol may be ZigBee Light Link.

According to another aspect disclosed herein, there is provided an illumination source for use as one of a plurality of nodes to potentially be joined to a wireless network, each of said plurality of nodes being configured to operate according to a wireless networking protocol of said network, and each being a component device of a lighting system; wherein an initiating unit will wirelessly broadcast a discovery request using said wireless networking protocol, and wherein according to said protocol each of said plurality of nodes is configured to only respond to the discovery request as broadcast from the initiating unit on condition of being within a predetermined range of the initiating unit. The illumination source is configured so that: if the illumination source determines itself to be one of one or more in-range nodes within said range of the initiating unit, the illumination source responds to the discovery request from the initiating unit and thereby join the wireless network, but if the illumination source determines itself to be one of one or more out-of-range nodes beyond said range of said initiating unit, the illumination sources does not respond to the discovery request from the initiating unit. Further, the illumination source is configured so that if it determines itself to be one of the in-range nodes, to act as a relaying node to re-broadcast the discovery request for receipt by one or more of the out-of-range nodes; and if the illumination source determines itself to be one of the out-of-range nodes, to be able to respond to the discovery requests as re-broadcast from one of the relaying nodes, thereby joining the wireless network (note that the response may also be conditional on one or more further conditions, e.g. being within a certain number of hops of the initiating unit, or being within a certain time window).

According to another aspect disclosed herein, there is provided a wireless node for communicating in a network and being configured to operate according to a wireless networking protocol of said network, said wireless node comprising a receiver to receive a discovery request broadcast wirelessly using said wireless networking protocol, wherein according to said protocol said wireless node is configured to only respond to the discovery request as broadcast from the initiating unit on condition of being within a predetermined range of an initiating unit;

a measurement unit configured to determine whether said wireless node is within said predetermined range;

a transceiver adapted for responding to the discovery request upon determination that the wireless node is within said predetermined range and cause the wireless node to join the wireless network, wherein the wireless node is configured to act as a relaying node upon determination that the wireless node is within said predetermined range, so that to re-broadcast the discovery request for receipt by one or more out-of-range nodes.

According to another aspect disclosed herein, there is provided a computer-program product for operating a respective one of a plurality of nodes to potentially be joined to a wireless network, each of said plurality of nodes being configured to operate according to a wireless networking protocol of said network, and each being a component device of a lighting system, with at least some being illumination source; wherein an initiating unit will wirelessly broadcast a discovery request using said wireless networking protocol, and wherein according to said protocol each of said plurality of nodes is configured to only respond to the discovery request as broadcast from the initiating unit on condition of being within a predetermined range of the initiating unit. The computer program product comprises code embodied on a computer-readable storage medium, configured so as when run on the respective node to perform operations of: determining whether the respective node is one of one or more in-range nodes within said range of the initiating unit, or whether the respective node is one of one or more out-of-range nodes beyond said range of said initiating unit; if the respective node is one of the in-range nodes, responding to the discovery request from the initiating unit and thereby joining the wireless network; if the respective node is one of the out-of-range nodes, not responding to the discovery request from the initiating unit; if the respective node is one of the in-range nodes, operating the respective node to act as a relaying node to re-broadcast the discovery request for receipt by one or more of the out-of-range nodes; and if the respective node is one of the out-of-range nodes, responding to the discovery requests as re-broadcast from one of the relaying nodes, thereby joining the wireless network (note again that the response may also be conditional on one or more further conditions, e.g. being within a certain number of hops of the initiating unit, or being within a certain time window).

According to another aspect disclosed herein, there is provided system comprising: a plurality of nodes to potentially be joined to a wireless network, each of said plurality of nodes being configured to operate according to a wireless networking protocol of said network, and each being a component device of a lighting system, with at least some of said plurality of nodes comprising illumination sources; and an initiating unit arranged to wirelesly broadcast a discovery request using said wireless networking protocol, wherein according to said protocol each of said plurality of nodes is configured to only respond to the discovery request as broadcast from the initiating unit on condition of being within a predetermined range of the initiating unit. Each respective one of said plurality of nodes is configured so that: if the respective node determines itself to be one of one or more in-range nodes within said range of the initiating unit, the respective node responds to the discovery request from the initiating unit and thereby join the wireless network, but if the respective node determines itself to be one of one or more out-of-range nodes beyond said range of said initiating unit, the respective node does not respond to the discovery request from the initiating unit. Each of said plurality of nodes is further configured so as, if one of the in-range nodes, to act as a relaying node to re-broadcast the discovery request for receipt by one or more of the out-of-range nodes. Furthermore, each of said plurality of nodes is further configured so as, if one of the out-of-range nodes, to be able to respond to the discovery requests as re-broadcast from one of the relaying nodes, thereby joining the wireless network (note again that the response may also be conditional on one or more further conditions, e.g. being within a certain number of hops of the initiating unit, or being within a certain time window).

In embodiments, any of the method, illumination source, system and/or computer program product may further comprise features in accordance with any of the features disclosed above or elsewhere herein.

BRIEF DESCRIPTION OF THE DRAWINGS

To assist understanding of the present application and to show how embodiments may be put into effect, reference is made by way of example to the accompanying drawings in which.

DETAILED DESCRIPTION OF EMBODIMENTS

Figure 1:
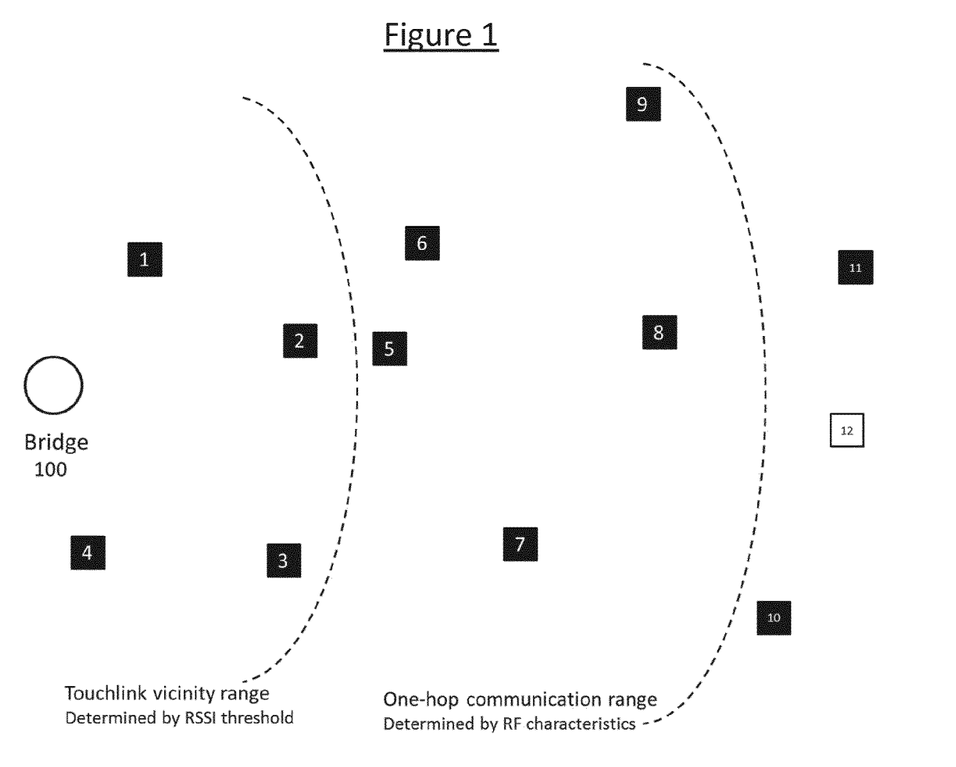
FIG. 1 is a schematic diagram of a lighting network.

FIG. 1 illustrates a new installation of lighting products to be commissioned into a ZLL network. The installation comprises one bridge controller 100 and eleven lighting nodes 1 to 11. A twelfth lighting node 12 is located close to the installation but belongs to another, already existing ZLL network. In embodiments, each of the lighting nodes comprises an illumination source for illuminating an environment such as a room or rooms, and/or an outdoor space. Each of the illumination sources may take the form of a luminaire, or an individual lamp in the case where more than one independently addressable lamp can by housed in the same luminaire (a lamp refers to the light emitting element, while a luminaire refers to the fixture comprising one or more lamps and any associated socket, housing and/or support).

Figure 2:
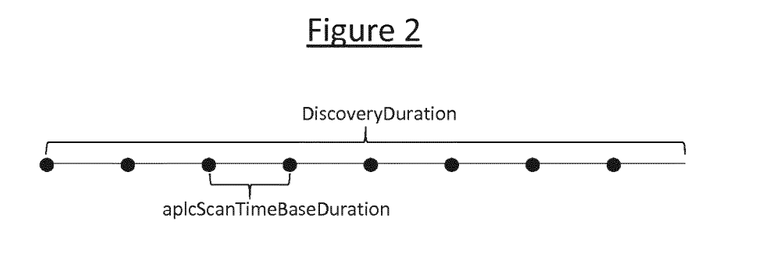
FIG. 2 is a schematic diagram showing the timing of a discovery process.

According to the device discovery process defined by the current ZLL standard, the bridge controller 100 follows the initiator procedure to broadcast eight inter-PAN scan request commands, spaced at an interval of aplcScanTimeBaseDuration (~250 ms). The inter-PAN scan request command is a kind of discovery request according to the ZLL standard, which seeks out other nearby nodes. FIG. 2 illustrates the initiator procedure of the device discovery process. After each broadcasting of a scan request (represented as one dot), the initiator shall wait aplcScanTimeBaseDuration to receive any responses. A complete discovery procedure will take one DiscoveryDuration, which is eight aplcScanTimeBaseDuration so roughly 2 seconds. Lighting nodes nos. 1-8 will be able to receive the scan request commands because they are located within the one-hop communication range of the bridge controller 100. Following the target procedure of the device discovery process, only lighting nodes nos. 1-4 will respond to the request and being further added to the ZLL network, because they are located within the Touchlink vicinity range of the bridge controller 100. Lighting nodes nos. 5-8, together with lighting nodes nos. 11-12 which never receive the scan request, can't be discovered and be added to the network automatically by the bridge 100.

Figure 3:
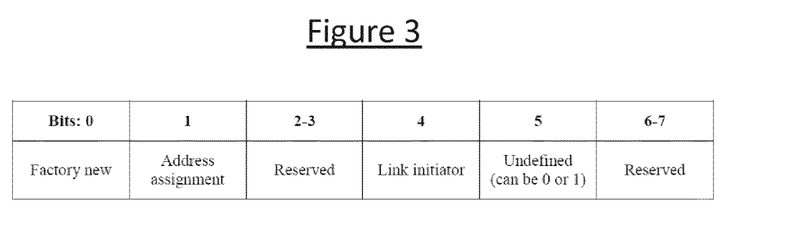
FIG. 3 is a schematic illustration of the format of a scan request.

To expand the device discovery range, the proposed method reuses the initiator procedure of the device discovery process of the ZLL standard, and set the bits 2-3 of the ZLL information field of the scan request command as indication of the depth of expansion. Refer to FIG. 3, which shows the format of the scan request ZLL information field, where bits 2-3 of the ZLL information field are reserved in the current standard. In embodiments disclosed herein, the method uses these two bits to record a hop limit, referred to herein as ScanDepth. By adjusting ScanDepth, the discovery range of the commissioning method can be expanded in a controlled way, i.e. the higher the ScanDepth, the broader the range. For applications with very broad installation base, a ScanDepth of 3 (0b11) might be not enough. Then the bits 6-7 of the ZLL information field can be used and together a 4-bits ScanDepth can be used to achieve a maximal depth of 15 (0b1111).

A scan request command with non-zero ScanDepth value will be treated as a special scan request by the receiving node. The following method adapts the target procedure of the device discovery process for a received special scan request, while the target procedure for normal scan requests remains intact. For a receiving node located within the Touchlink vicinity range of the initiator 100, instead of immediately responding to the initiator (i.e. unicast a scan response inter-PAN command to the initiator), the node will perform the following steps.

S1. Determine whether the node is still within its commissioning time-window by checking the Timer_for_Discovery which is set during device startup. If the timer has not expired, continue with step S2. Otherwise, ignore the request and abort.

S2. Check the LocalTransactionID variable in its local memory. If the LocalTransactionID is null, then:

S2a. set the value of the local variable LocalTransactionID as the "transaction ID" of the received scan request command;

S2b. set the value of the local variable LocalScanDepth as the "ScanDepth" of the received scan request command minus 1, i.e. (LocalScanDepth="ScanDepth"−1);

S2c. record the sender of the scan request command as the node's parent node;

S2d. check whether its LocalScanDepth is zero (i.e., 0b00). If not, continue with step S3; otherwise, go to step S5.

If the LocalTransactionID is not null, then ignore the scan request and go to step S4.

S3. Perform a new device discovery, i.e. broadcast eight special scan request commands with the "transaction ID" of the commands set as LocalTransactionID and the "ScanDepth" of the command (i.e., bits 2-3 of the ZLL information field) set as LocalScanDepth. After completing all the broadcasting, set the node's Timer_for_Response to (2×LocalScanDepth-1)×DiscoverDuration;

S4. Wait to receive any response until the Timer_for_Response has expired.

S5. Respond to the node's parent node. Details on how to respond will be described later.

During the device discovery process (i.e., the intervals between the broadcasting) of step S3 and the waiting for response of step S4, the node might receive three types of command, as follows.

A normal scan response command, which is sent by a receiving node of the scan request command broadcasted by the node. The node should act normally as defined by the current ZLL standard, i.e. to validate the response and record necessary information of the sender.

A normal scan request command, which could be broadcasted by any ZLL initiator. The node should act normally as defined by the current ZLL standard, i.e. to choose whether to respond (it is up to the application).

A special scan request command, which is broadcasted by any node in its vicinity. The node should ignore the request because it is in a middle of the device discovery process.

During step S4, the node might again receive three types of command, as follows.

A normal scan request command, which could be broadcasted by any ZLL initiator. The node should act the same way as in step S3.

A special scan request command, which is broadcasted by any node in its vicinity. The node should go to step S1, ignore the request in step S2, and go back to step S4.

A special scan response command, which is sent in a later stage by a device discovered during the device discovery process. Details on the command and how to respond will be described later.

Receiving nodes located outside the Touchlink vicinity range will just ignore a special scan request.

Figure 4:
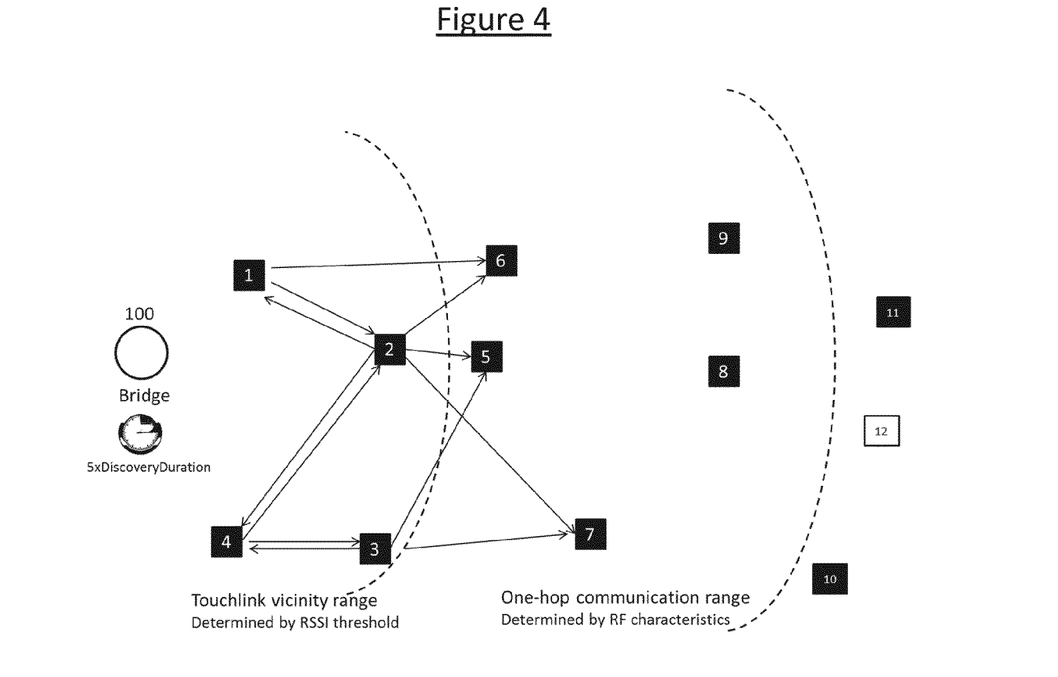
FIGS. 4 to 11 are further schematic diagrams showing operation of the lighting network during a commissioning process.

FIG. 4 to FIG. 11 illustrate the new commissioning process according to one embodiment of the invention. Referring to FIG. 4, the bridge controller 100 starts an expanded device discovery by broadcasting eight special scan request commands with the ScanDepth set as 0b11 (i.e. 3) and the "Transaction ID" set as TransactionID. After that, the bridge 100 waits for 5×DiscoveryDuration (i.e. 2×3-1=5) to receive any response. On receiving a special scan request command, lighting nodes nos. 5-9 won't respond because they are outside of the Touchlink vicinity range of the bridge controller 100.

Lighting nodes nos. 1-4 won't immediately unicast scan response commands to the bridge. Instead, each lighting node will perform the following steps.

T1. Discover that its Timer_for_Discovery has not expired and its LocalTransactionID is null, and set the value of LocalTransactionID as TransactionID and the value of the LocalScanDepth as 0b10, and records the bridge controller as its parent node 100. Since the LocalScanDepth is not zero, continue with step T2.

T2. Perform a new expanded device discovery by broadcasting eight special scan request commands (represented by arrow lines with different colors) with the ScanDepth set as 0b10 (i.e., 2) and the "Transaction ID" set as TransactionID. After that, set the nodes' Timer_for_Response to 3×DiscoveryDuration (i.e. 2×2-1=3).

T3. Wait to receive any response until the Timer_for_Response has expired.

T4. Respond to the node's parent node. Details on how to respond will be described later.

Since lighting nodes nos. 1-4 perform the device discovery in parallel, very possibly they will also receive special scan request commands during the device discovery process of step T2, or during the waiting for response of step T3. In both cases, the lighting node will ignore the request and continue with the current step.

As shown in FIG. 4, lighting nodes nos. 5-7 also received the special scan request commands sent by lighting nodes nos. 1-4 and are located within the Touchlink vicinity range of the corresponding sender. Please note that lighting nodes nos. 8-11 might also receive the special scan request commands sent by lighting nodes nos. 1-4 since they are located within the one-hop communication range of lighting nodes 1-4. However, they will ignore the requests because they are outside the Touchlink vicinity range of lighting nodes nos. 1-4 and therefore arrow lines from lighting nodes nos. 1-4 to lighting nodes nos. 8-11 are not shown in FIG. 4 for the sake of simplicity.

Figure 5:
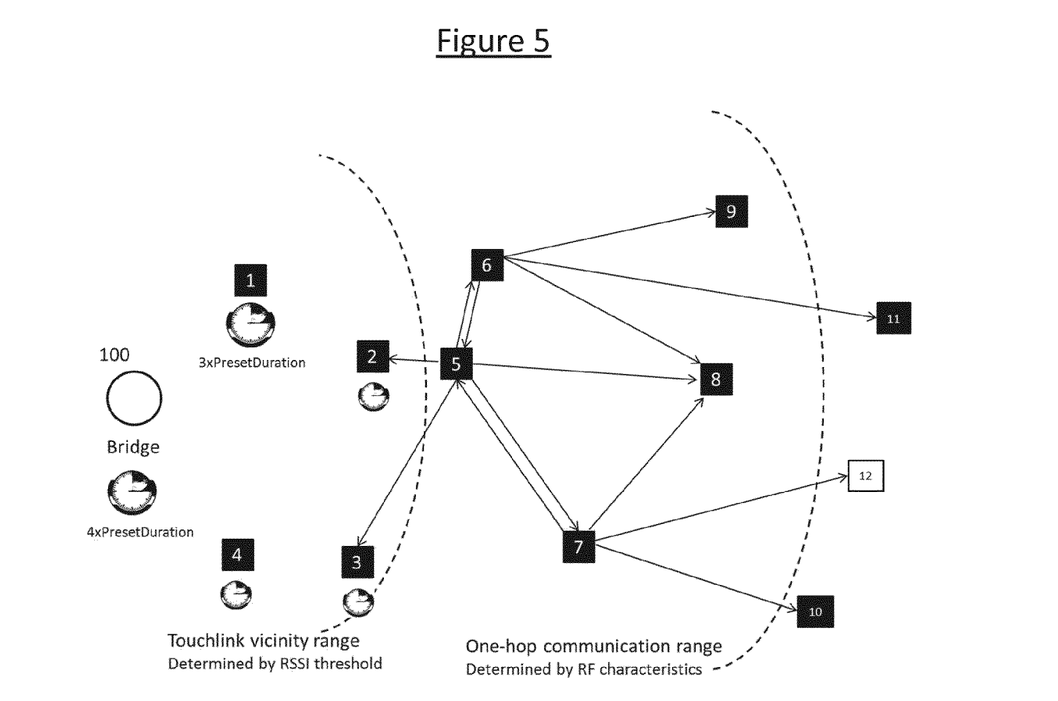

Taking the lighting node no. 5 as an example, this node receives the special scan requests from lighting nodes no. 2 and no.3 and is located within the Touchlink vicinity range of both lighting nodes 2 and 3. Checking that its Timer_for_Discovery has not expired, lighting node no. 5 can then choose to respond to a scan request sent by either of the parent lighting nodes 2 or 3 and follow steps T1 to T4 as set out above. FIG. 5 illustrate the status where lighting nodes nos. 1-4 are at step T3 (waiting for response) and lighting nodes nos. 5-7 are at step T2 (broadcasting special scan request commands with the ScanDepth set as 0b01 and the "Transaction ID" set as TransactionID).

Figure 6:
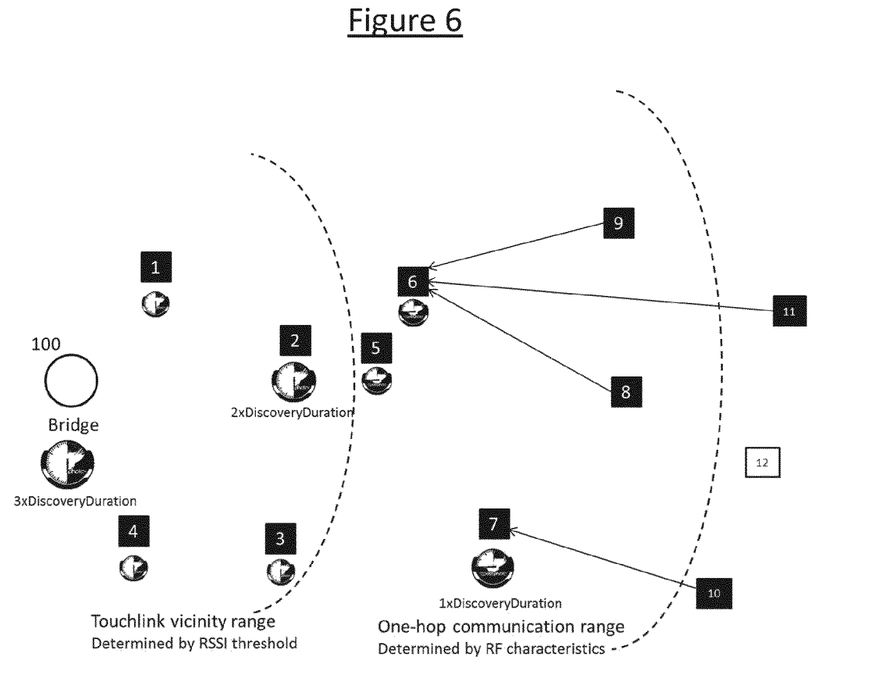

Similarly, upon receiving the special scan requests sent by lighting nodes nos. 5-7, lighting nodes nos. 8-11 will follow the step T1 and jump to step T4 since LocalScanDepth is zero, while other lighting nodes (i.e. nos. 2, 3, 5, 6 and 7) will just ignore and continue waiting for response. Lighting node.12 also receives the special scan request commands sent by lighting node no. 7. However, lighting node no.12 won't respond since its Timer_for_Discovery has expired. FIG. 6 illustrate the status where lighting nodes nos. 1-7 are at step T3 (waiting for response) and lighting nodes nos. 8-11 are at step T4. As shown in FIG. 6, each of lighting nodes nos. 8-11 unicasts a normal scan response inter-PAN command to its parent node respectively.

When its Timer_for_Response expires, lighting node no.6 has received three normal scan response commands, and lighting node no. 7 has received one normal scan response command. Lighting node no. 5 receives no scan response from any node. Then, lighting nodes nos. 5-7 enter into step T4. Depending on whether a lighting node has received any scan response during step T2 and T3 (i.e. before its Timer_for_Response expires), the lighting node in question will unicast either a normal or a special scan response inter-PAN command to its parent node. In embodiments, the present method uses four bits (i.e. 2-3 and 6-7) of the ZLL information field of the scan response command to indicate the number of scan response commands that has been received by a lighting node, this being referred to herein as NumOfChild. A scan response command with non-zero NumOfChild value will be treated as a special scan response by the receiving (parent) node.

Figure 7:
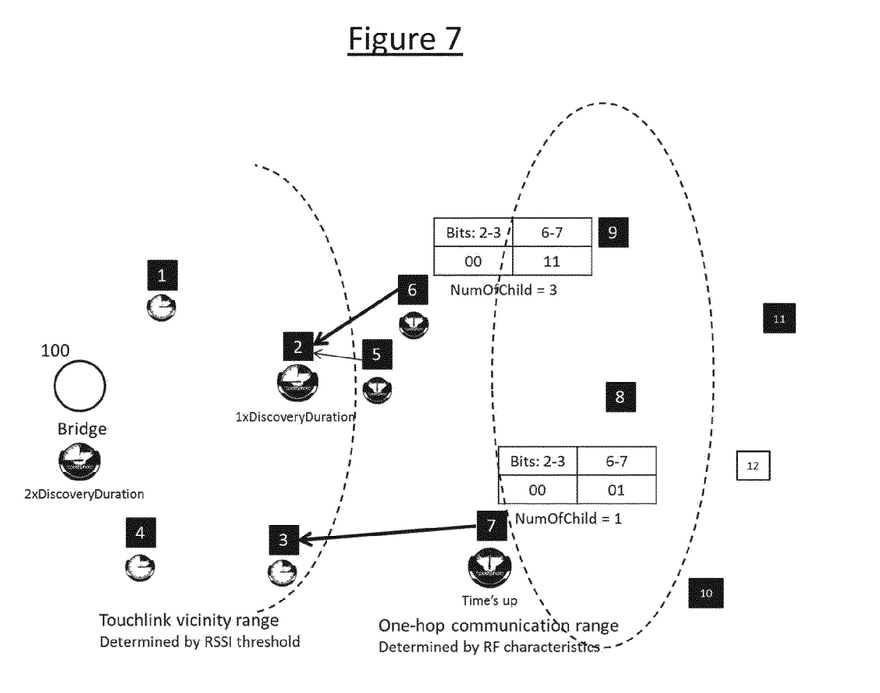

FIG. 7 illustrates the status where lighting nodes nos. 1-4 are at step T3 (waiting for response) and lighting nodes nos. 5-7 are at step T4. Here:

Lighting node no. 5 sends a normal scan response to lighting node no. 2 because it received no scan response while waiting; and Lighting nodes no. 6 and no. 7 send a special scan response (represented by a green and bold arrow line) to lighting nodes no. 2 and no. 3 respectively, because they received one or more scan response commands (either normal or special) while waiting.

Figure 8:
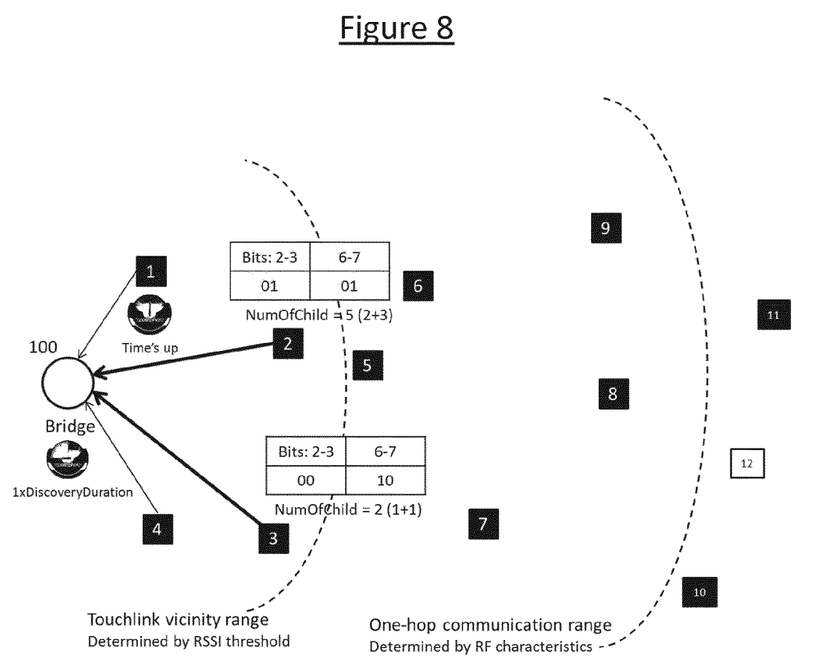

Similarly, once having progressed into step T4 as illustrated by FIG. 8, lighting nodes no. 1 and no. 4 send a normal scan response to the bridge controller 100 because they received no scan response during step T2 and T3. Each of lighting nodes no. 2 and no. 3 first calculates its NumOfChild by adding the number of received normal scan responses and the sum of the NumOfChild of all the received special scan responses, and then unicasts a special scan response command with the calculated NumOfChild to the bridge controller 100.

Figure 9:
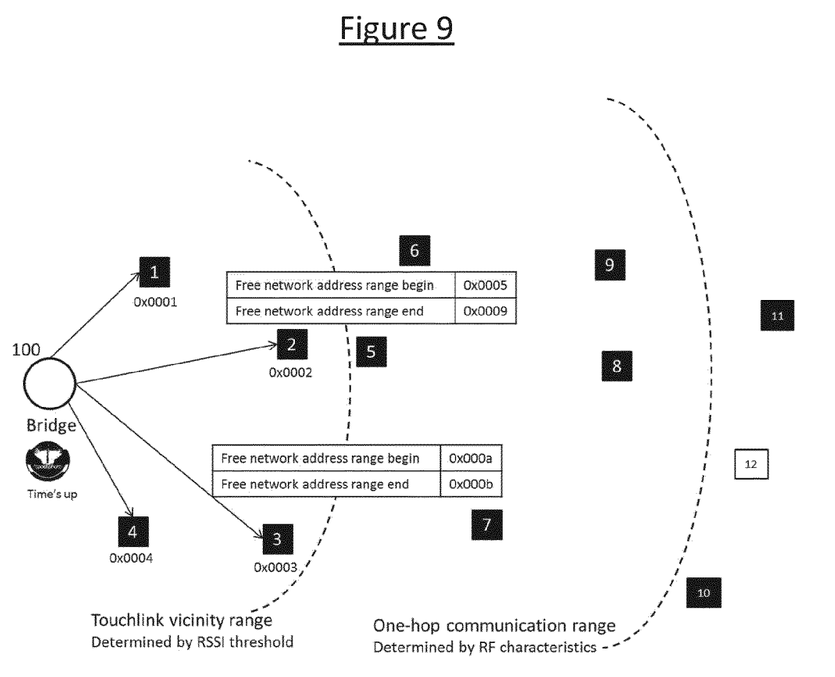
Figure 10:
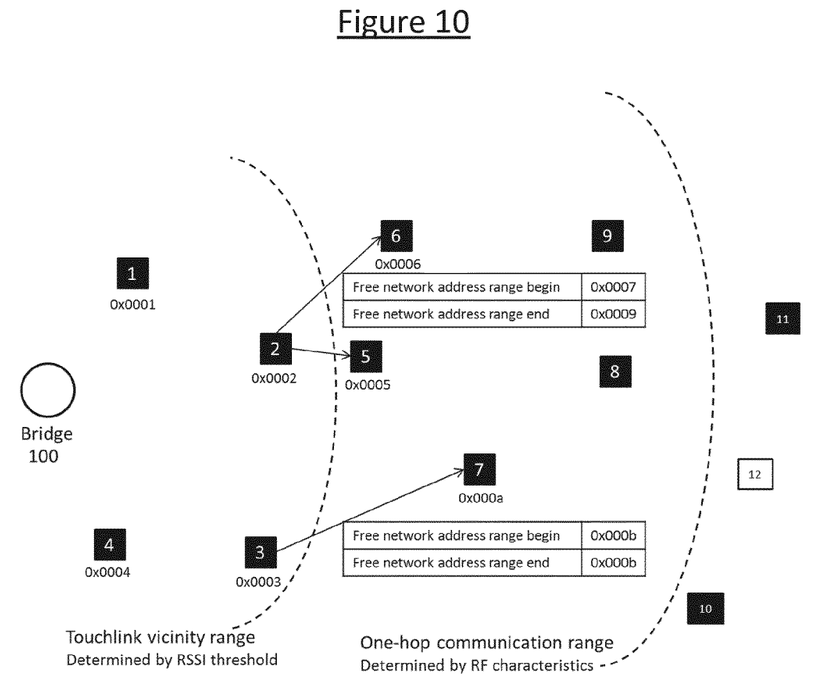
Figure 11:
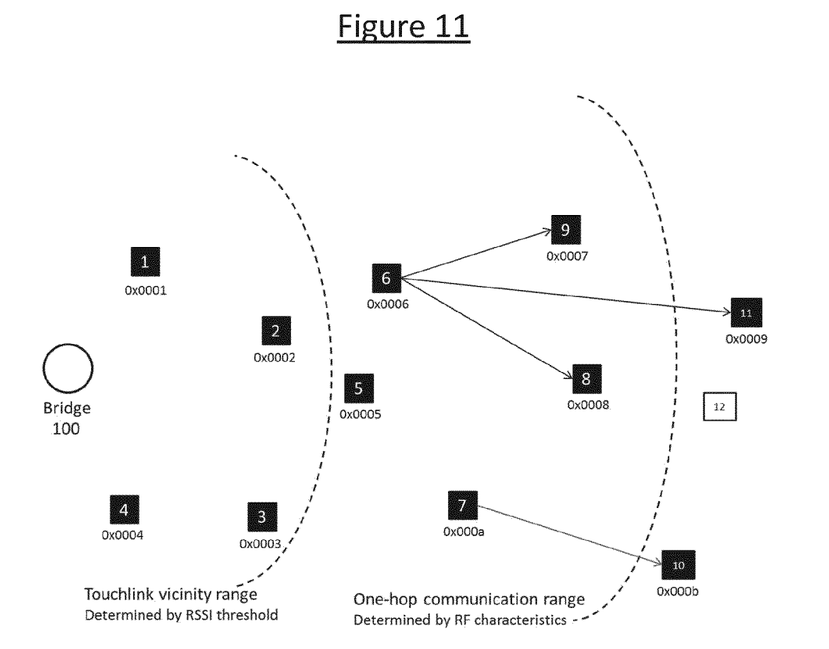

When the bridge 100 stops waiting, the expanded device discovery process is completed with all the lighting nodes (i.e. nos. 1-11) being discovered. Please note that at this moment the Timer_for_Discovery of these lighting nodes might still unexpired because the timer could be set according to the maximal scan depth. In the next stage of the commissioning, a lighting node which sent a special scan response during the expanded device discovery process will be delegated the "adding nodes into network" task by its parent node. Referring to FIG. 9, the bridge controller 100 has added all the lighting nodes located in its Touchlink vicinity range (i.e. lighting nodes nos. 1-4) into a ZLL network and assigned a network address to each of them, by following the normal commissioning procedure as described in the background section. When adding lighting nodes no. 2 and no. 3 into the network, the bridge controller 100 also assigns a free network range according to the NumOfChild of the light node by setting the "Free network address range begin" and "Free network address range end" fields of the network join router request inter-PAN command. This way, the lighting nodes are delegated the task of further adding their child nodes into the network.

After joining the network, the lighting nodes being delegated to will further add their child nodes into the network. Similarly, each will further delegate part of the task to its child node (s) if the child has sent special scan response during the expended device discovery process. For example, referring to FIG. 10 and FIG. 11, lighting node no. 2 will add lighting nodes no. 5 and no. 6 into the network, and delegate lighting node no. 6 the task of adding its own child nodes into the network. Hence lighting node no. 6 will then add lighting nodes nos. 8, 9 and 11 into the network.

According to another embodiment of the invention, the expanded device discovery process of could progress faster by allowing receiving nodes located within the one-hop communication range of the initiator 100 to respond to a special scan request, i.e. following steps T1 to T4. This leads to a quicker discovery process with a smaller ScanDepth. Since the commissioning time-window is still in place, unintended commissioning can be avoided. This however does not entirely comply with the current ZLL standard.

It will be appreciated that the above embodiments have been described only by way of example.

For instance, the techniques disclosed herein can also apply to other ZigBee protocols, or any other protocol of a mesh network whereby, according to that protocol, each compliant node is only allowed to respond to a discovery request as broadcast from a given source on condition of being within a predetermined range of that source. In any such case, the principles disclosed herein can be used to extend the discovery range beyond that originally envisaged by the standard. Note also that as different protocol may be used, this may imply other forms of the various messages discussed above, e.g. other forms of discovery request and other types of response. It will be understood that it is the function of the message that is relevant, not the particular name or format of the message.

Further, while the above has been described in terms of lighting nodes 1-12 each taking the form of a device comprising an illumination source, it will be appreciated that the above techniques can also be applied in relation to other types of component found in a lighting system. For example, any one or more of the nodes could alternatively take the form of: a switch for manually switching one or more of the illumination sources and off or dimming them up and down; a timer for timing a behaviour of one or more of the illumination sources (e.g. when do they switch on and off, or to time a dynamic dimming pattern); a presence sensor or other sensors, based upon which one or more of the illumination sources are automatically controlled (e.g. the sources automatically switch on or dim up in response to detecting presence of a user in the environment); or a remote control unit enabling a user to control one or more of the illumination sources (e.g. to dim them up or down, or switch them on or off, or set a dynamic lighting scene).

Further, in the above it has been described how a node only responds to a re-broadcast discovery request if received within a specified response time window from power up, and that a relaying node only re-broadcasts a discovery request if within a specified relaying time window from power up. However, in embodiments the respective nodes could be configured such that any of one or more potential events triggers the start of the time window, particularly: power up (power is first turned on for the first time ever or after being switched off for a period), reset (the power is reset and/or the logical state of the node is reset), and/or leaving a network which the node was previously connected to. In embodiments, a node will seek for joining a network only when it doesn't belong to a network, e.g. a device that is in or returns to the "Factory New" (FN) state in ZLL or another ZigBee protocol. Hence in embodiments the relevant window may run from the time the node becomes FN. For such a device, there is no distinction made between "power on" and "reset", or simply leaving a previous network.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of enabling at least some of plurality of nodes to join a wireless network, each of said plurality of nodes being configured to operate according to a wireless networking protocol of said network and each being a component device of a lighting system, with at least some of said plurality of nodes comprising illumination sources; wherein according to said method:
  an initiating unit wirelessly broadcasts a discovery request using said wireless networking protocol, wherein according to said protocol each of said plurality of nodes is configured to only respond to the discovery request as broadcast from the initiating unit on condition of being within a predetermined range of the initiating unit, said predetermined range being defined by a received signal strength indicator of the received discovery request being above a predetermined threshold;
  one or more in-range nodes, corresponding with nodes from the plurality of nodes that are within said predetermined range of the initiating unit, each respond to the discovery request from the initiating unit and thereby join the wireless network, while one or more out-of-range nodes corresponding with nodes from the plurality of nodes that receive the discovery request from said initiating unit broadcast, but are not within the predetermined range of said initiating unit, do not respond to the discovery request from the initiating unit;
  one or more of the in-range nodes act as relaying nodes upon detecting a non-zero remaining hop count in the received discovery request, and are configured to re-broadcast the discovery request for receipt by one or more of the out-of-range nodes that are not within the predetermined range of said initiating unit, and wherein the remaining hop count in the re-broadcast discovery request is decremented each time when the discovery request is re-broadcasted, and
  wherein each of the out-of-range nodes receiving the re-broadcast discovery request determines whether it is within a predetermined number of hops based on the remaining hop count as received in the re-broadcast discovery request; and
  one or more of the out-of-range nodes only respond to the re-broadcast discovery request on conditions of being within a predetermined range of a corresponding sender of the re-broadcast discovery request the and within the predetermined number of hops of the initiating unit, thereby joining the wireless network.

2. The method of claim 1, wherein:
  one or more of the out-of-range nodes, being within a predetermined range of a corresponding sender of the re-broadcast discovery request, each also act as a relay node to re-broadcast the discovery request, upon detecting a non-zero remaining hop count in the discovery request received from at least one of the in-range relaying nodes, for receipt by a further one or more of the out-of-range nodes, such that the request is re-broadcast over two or more hops, each instance of the discovery request being broadcast or re-broadcast being a hop, and the remaining hop count in the re-broadcasted discovery request is decremented each time when the discovery request is re-broadcasted; and
  one or more of the out-of-range nodes only respond to the discovery request as re-broadcast by a preceding one of the out-of-range relay nodes on conditions of being within a predetermined range of a corresponding sender out of out-of-range relay nodes and within a predetermined number of hops of the initiating unit, thereby joining the wireless network.

3. The method of claim 1, wherein each respective one of the out-of-range nodes only responds to the re-broadcast discovery request if received within a response time window from a time of the respective out-of-range node powering up, being reset, or leaving a previous network.

4. The method of claim 1, wherein the response time window is a function of the maximum hop count.

5. The method of claim 1, wherein each respective one of the relaying nodes only re-broadcasts the discovery request if within a specified relaying time window from a time of the respective relaying node powering up, being reset or leaving a previous network.

6. The method of claim 1, wherein one or more of said plurality of nodes are devices other than illumination sources, each being one of: a switch, a timer, a sensor, or a remote control unit.

7. The method of claim 1, wherein when each responding one of the out-of-range nodes responds to a respective one of the re-broadcast discovery requests from a respective one of the relaying nodes, the responding node sends a respective response back to the respective relaying node and the respective relaying node performs the joining of the responding node to the network on behalf of the initiating unit.

8. The method of claim 7, wherein the respective relaying node is delegated a free address range allowed by the initiating unit; and when joining the responding node to the network, the respective relaying node assigns the responding node an address from within said free address range by which to be addressed within the network.

9. The method of claim 1, wherein said protocol is a ZigBee protocol.

10. The method of claim 9, wherein said protocol is ZigBee Light Link.

11. A wireless node for communicating in a network and being configured to operate according to a wireless networking protocol of said network, said wireless node comprising:
- a receiver to receive a discovery request broadcast wirelessly using said wireless networking protocol, wherein according to said protocol said wireless node is configured to only respond to the discovery request as broadcast from an initiating unit on condition of being within a predetermined range of the initiating unit;
- a measurement unit configured to determine whether said wireless node is within said predetermined range, and wherein said predetermined range being defined by a received signal strength indicator of the received discovery request from the initiating unit (100) being above a predetermined threshold;
- a transceiver adapted for responding to the discovery request upon determination that the wireless node is within said predetermined range of the initiating unit and cause the wireless node to join the wireless network,
- wherein the wireless node is configured to act as a relaying node upon determination that the wireless node is within said predetermined range of the initiating unit and a non-zero remaining hop count is detected in the received discovery request, so as to re-broadcast the discovery request for receipt by one or more out-of-range nodes that are not within out-of-said predetermined range of said initiating unit (100), and
- wherein acting as an in-range relaying node (1-3), the wireless node is further configured to decrement the hop count in the re-broadcast discovery request.

12. The wireless node of claim 11, wherein the receiver is configured for receiving a response to said re-broadcasted discovery request from at least one of the out-of-range node responding to said re-broadcast discovery request, wherein the wireless node is adapted for performing the joining of the out-of-range node to the network on behalf of the initiating unit.

13. A system comprising:
- a plurality of nodes to potentially be joined to a wireless network, each of said plurality of nodes being configured to operate according to a wireless networking protocol of said network, and each being a component device of a lighting system, with at least some of said plurality of nodes comprising illumination sources; and
- an initiating unit arranged to wirelessly broadcast a discovery request using said wireless networking protocol, wherein according to said protocol each of said plurality of nodes is configured to only respond to the discovery request as broadcast from the initiating unit on condition of being within a predetermined range of the initiating unit, wherein said predetermined range being defined by a received signal strength indicator of the discovery request from the initiating unit (100) being above a predetermined threshold;
- wherein each respective one of said plurality of nodes is configured so that: if the respective node determines itself to be one of one or more in-range nodes within said predetermined range of the initiating unit, to respond to the discovery request from the initiating unit and thereby join the wireless network, and if the respective node receives the broadcast but determines itself to be one of one or more out-of-range nodes that is not within said predetermined range of said initiating unit, not to respond to the discovery request from the initiating unit;
- wherein each of said plurality of nodes is further configured so as, when one of the in-range nodes, to act as a relaying node upon detecting a non-zero remaining hop count in the received discovery request to re-broadcast the discovery request for receipt by one or more of the out-of-range nodes, and decrement the hop-count in the re-broadcast discovery request, and when one of the out-of-range nodes receiving the re-broadcast discovery request determines whether it is within a predetermined number of hops based on the remaining hop count as received in the re-broadcast discovery request; and
- wherein each of said plurality of nodes is further configured so as, if one of the out-of-range nodes, only respond to the re-broadcast discovery request on conditions of being within the predetermined range of a corresponding sender out of said in-range relaying nodes (1-3) and within the predetermined number of hops of the initiating unit, thereby joining the wireless network.

* * * * *